(12) United States Patent
Kerns et al.

(10) Patent No.: US 6,257,194 B1
(45) Date of Patent: Jul. 10, 2001

(54) METHOD TO MANAGE INTERNAL COMBUSTION ENGINE SHUTDOWN

(75) Inventors: James Michael Kerns, Trenton; Imad Hassan Makki; Mazen Hammoud, both of Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/630,481

(22) Filed: Aug. 2, 2000

(51) Int. Cl.[7] ....................................................... F02B 77/00
(52) U.S. Cl. .................... 123/198 D; 123/198 F

(58) Field of Search ............................ 123/198 D, 198 F, 123/198 DB, 481

(56) References Cited

U.S. PATENT DOCUMENTS 3,714,932  2/1973  Meacham et al. .

*Primary Examiner*—Noah P. Kamen
(74) *Attorney, Agent, or Firm*—Carlos L. Hanze; William J. Coughlin

(57) ABSTRACT

A shutdown method for an internal combustion engine having deactivatable intake and exhaust valves is disclosed in which unburned fuel existing within the engine at the time of shutdown is managed to prevent its release into the atmosphere.

19 Claims, 2 Drawing Sheets

METHOD TO MANAGE INTERNAL COMBUSTION ENGINE SHUTDOWN

FIELD OF THE INVENTION

The present invention relates generally to a method for shutting down an internal combustion engine equipped with electronically deactivatable valves so as to minimize fuel evaporative emissions into the atmosphere.

BACKGROUND OF THE INVENTION

One mode by which vehicles may emit pollutants is during inactive periods in which fuel is vaporized and released from the vehicle into the atmosphere. The allowable levels of evaporative emissions is continually being decreased. As a consequence, vehicle manufacturers have developed and installed systems for managing fuel vapors emanating from fuel tanks. Also, measures are taken to reduce the amount of unburned fuel residing in the engine which could be released into the atmosphere during periods during which the vehicle is not operating.

The inventors of the present invention have recognized that engines equipped with electronically deactivatable valves present an opportunity for managing unburned fuel during an engine shutdown procedure not possible with conventional engines which have no provision for disabling the valves.

SUMMARY OF THE INVENTION

An object of the invention claimed herein is to provide a method for ceasing operation of an internal combustion engine having a throttle valve and a plurality of cylinders, each of the cylinders having a spark plug, electronically deactivatable intake and exhaust valves, and an adjoining intake port having a fuel injector. The method includes the steps of sensing a demand for cessation of engine operation, and determining whether the fuel injector has injected fuel since the occurrence of a corresponding and immediately prior combustion event. If it is determined that fuel has not been injected since the occurrence of the corresponding and immediately prior combustion event, perform a trapping intake event. If it is determined that fuel has been injected since the occurrence of the corresponding and immediately prior combustion event, perform a first intake event to induct injected fuel into said cylinder and perform a combustion event to burn the fuel.

The inventors herein have recognized that an engine equipped with deactivatable valves has the potential for trapping unburned fuel within the cylinder during a shutdown procedure of an engine, a measure which is not possible with conventional valvetrains. The fuel trapped within the cylinder is prevented from leaving the engine during a vehicle soak period, but is combusted during later engine operation. An advantage in the present invention is managing fuel injected into the engine following a demand for engine cessation which leads to a reduction in evaporative emissions from the vehicle.

Further, an article of manufacture for ceasing operation of an internal combustion engine in response to a demand for engine cessation is provided. The engine has a throttle valve and a plurality of cylinders; each of the cylinders has a spark plug and an adjoining intake port having a fuel injector. The article includes a computer readable program code in the computer usable medium for directing the computer to perform the steps of controlling operation of deactivatable intake and exhaust valves of the engine and the spark plug firing during cessation of engine operation. The computer storage medium comprises means for determining a demand for cessation of engine operation, means for determining whether fuel has been injected into an intake port since a corresponding and immediately prior combustion event within the cylinder, means for performing an intake event and ceasing operation of the intake and exhaust valves, in the event that no fuel has been injected since the corresponding and immediately prior combustion event and means for performing a first intake event and a combustion event in the event that fuel has been injected since the immediately prior combustion event.

In accordance with another aspect of the present invention an article of manufacture including a computer storage medium containing a computer program encoded for controlling operation of intake and exhaust valves of an internal combustion engine and spark plug firing includes means for determining a demand for cessation of engine operation and means for determining whether fuel has been injected into an intake port since a prior combustion event is provided. The article also includes means for performing an intake event and ceasing operation of said intake and exhaust valves, in the event that no fuel has been injected since the prior combustion event, and means for performing a first intake event and a combustion event, in the event that fuel has been injected since the prior combustion event.

Other objects, features, and advantages of the present invention will become apparent to the reader of this specification.

BRIEF DESCRIPTION OF THE DRAWINGS

The object and advantages described herein will be more fully understood by reading an example of an embodiment in which the invention is used to advantage, referred to herein as the Detailed Description.

DETAILED DESCRIPTION OF THE PREFERRED EMBODIMENTS

Figure 1:
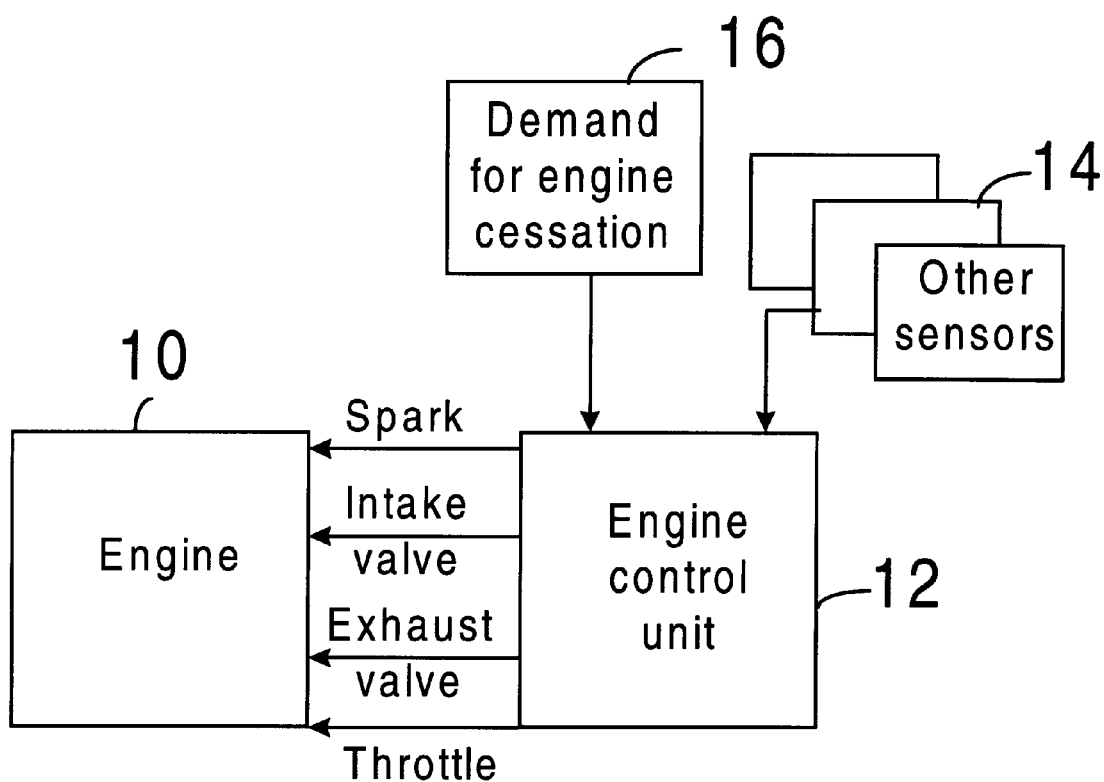
FIG. 1 is a system schematic of a preferred embodiment of the present invention.

FIG. 1 is a block diagram of an engine 10 is coupled to an engine controller 12. The engine controller 12 receives input of demand for engine cessation 16 and from other sensors 14. A demand for engine cessation 16 may be initiated by the driver or operator of the vehicle and determined by sensors associated with the vehicle key and the position of the ignition switch. Alternatively, engine 10 could be part of a hybrid electric vehicle and the demand for engine cessation 16 could be made by an engine management system as a result of batteries or other storage device being full. Other sensors 14, as known by those skilled in the art, may be a throttle position sensor, a crank angle rotation sensor, and an intake manifold absolute pressure sensor, as examples. The engine controller 12 manages engine shutdown by controlling the spark plugs, the intake valves, the exhaust valves, and the throttle of engine 10. As known by those skilled in the art, the engine controller 12 functions via computer code or programs which may be stored in computer storage media, input from sensors, and output to actuators to respond to and perform the demands of the engine controller 12.

Figure 2:
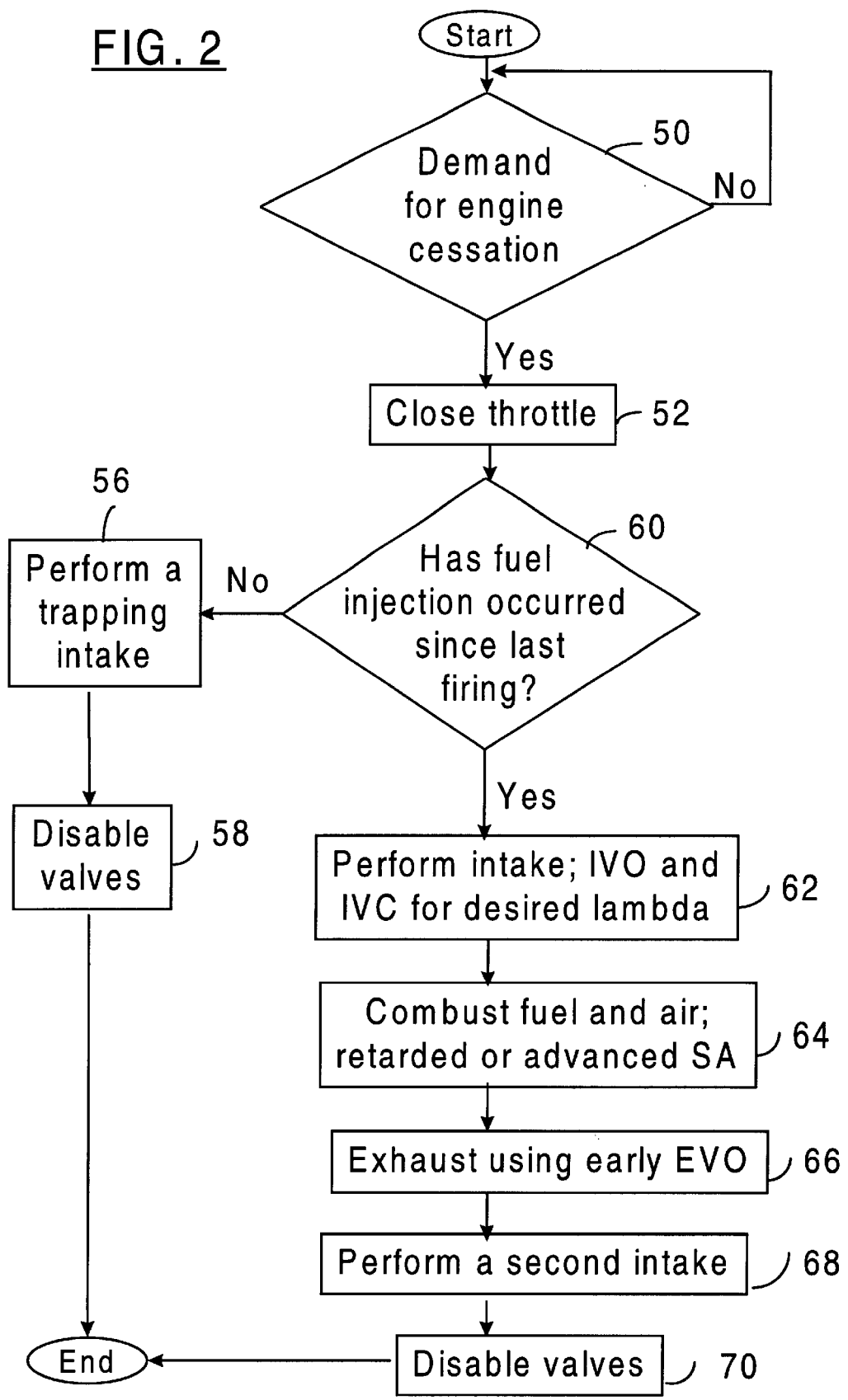
FIG. 2 is a flowchart of a preferred method of the present invention.

FIG. 2 is a flowchart showing the preferred embodiment of the method. The method is invoked when a request to cease engine operation has occurred as shown in block 50. The throttle valve in the intake line of the engine is commanded to close, block 52. The purpose in closing the throttle valve is to decrease pressure in the intake port thereby aiding vaporization of fuel within the intake port. If the engine is not equipped with a throttle valve, as may be the case for a fully camless engine with unlimited range in valve timings, step 52 is omitted. Alternatively for a camless engine, late intake valve opening may be used to promote the maximum velocity of the fresh charge through the intake valves to promote vaporization.

Referring again to FIG. 2, in block 60, it is determined whether a fuel injection event has occurred within the port since the most recent combustion event. Herein, the fuel injection event timing is taken at the end of the injection duration and the combustion event is taken at its initiation, that is, time of spark plug firing. The check in block 60 is performed for each cylinder in the engine. If a fuel injection has not occurred since the last firing, fuel remaining in the intake port must be managed. Control passes to block 56 in which an intake process occurs, that is, the intake valve is opened and closed during a time of downward piston travel. During the intake event, the fuel remaining in the intake port is drawn into the cylinder. Control passes to block 58 in which the intake and exhaust valves are disabled or deactivated. Thereby, the fuel inducted into the engine during step 56 is trapped within the cylinder.

If fuel has been injected since the most recent combustion event, i.e., a positive outcome of the check in block 60, control passes to block 62 in which an intake event is performed. The injected fuel is inducted into the cylinder along with fresh air during the intake stroke. The intake valve events, intake valve opening, IVO, and intake valve closing, IVC, are selected so that the Quantity of air inducted is in proportion to the fuel inducted to give the desired lambda, the relative air-fuel ratio. In block 64, the fuel and air are combusted within the cylinder. The spark timing is advanced or retarded from MBT (minimum spark advance for best torque) so as to reduce the amount of work produced with the combustion event. As known to those skilled in the art, work done on the piston is proportional to torque output of the engine. As the goal is to cease rotation of the engine quickly, work done by the combustion pressure on the piston or torque production is not the desired outcome. Instead, the purpose of the combustion event is to consume the fuel so that it is not available to be released later. By definition, either retarding or advancing the spark timing from MBT reduces torque derived from the combustion event. The advantage of advancing the combustion event is that there is more time available prior to the exhaust stroke to completely burn the inducted fuel and air. It may be found, though, that conventional engine controllers do not have enough range to advance the combustion event, in which case spark retard may be preferred.

Referring again to FIG. 2, control passes to block 66 in which an exhaust event occurs. It may be found preferable to cause the exhaust valve opening, EVO, to be advanced from its prior EVO. By advancing EVO, the amount of expansion work done on the piston is lessened. Advancement of EVO is another measure by which the amount of torque produced by the engine during shutdown is reduced. Following exhaust, block 66, a second intake event is performed in block 68, purpose of which is to induct fuel remaining in the intake port. Following the intake of block 68, the intake and exhaust valves are disabled in block 70 to trap the gases within the cylinder.

The invention described herein applies to camshaft actuated intake and exhaust valves equipped with electronic valve deactivators, electro-mehcanically or electro-hydraulically actuated valves with unlimited adjustability in timing, and combinations thereof. The ability of the engine to alter IVO, IVC, or EVO, as discussed above, is constrained, however, by the adjustability inherent in the system.

While the best mode for carrying out the invention has been described in detail, those familiar with the art to which this invention relates will recognize alternative designs and embodiments for practicing the invention. Thus, the above-described preferred embodiment is intended to be illustrative of the invention, which may be modified within the scope of the following claims:

What is claimed is:

1. A method for ceasing operation of an internal combustion engine, the engine having a throttle valve and a plurality of cylinders, each of the cylinders having a spark plug, electronically deactivatable intake and exhaust valves, and an adjoining intake port having a fuel injector disposed therein, the method comprising the steps of:

sensing a demand for cessation of engine operation;

determining, for one of more of the cylinders, whether the fuel injector has injected fuel since the occurrence of a corresponding and immediately prior combustion event; and performing a trapping intake event, for the one or more o f the cylinders, to trap unburned exhaust gases within the one or more cylinders if it is determined, pursuant to said determining step, that fuel has not been injected since the occurrence of the corresponding and immediately prior combustion event.

2. The method according to claim 1, further comprising the steps of:

performing a first intake event, for the one or more of the cylinders, to induct injected fuel into the cylinder if it is determined, pursuant to said determining step, that fuel has been injected since the occurrence of the corresponding and immediately prior combustion event; and performing a combustion event, for the one or more of the cylinders, to burn said fuel.

3. The method according to claim 2, further comprising the step of closing the throttle valve immediately following said cessation sensing step.

4. The method according to claim 2, wherein said step of performing the combustion event comprises the step of performing an advanced spark plug firing to initiate the combustion event so that work done on the piston by the ensuing combustion pressure is lessened.

5. The method according to claim 2, wherein said step of performing the combustion event comprises the step of performing a retarded spark plug firing to initiate the combustion event so that work done on the piston by the ensuing combustion pressure is lessened.

6. The method according to claim 2, further comprising the step of performing an exhaust event following said combustion event.

7. The method according to claim 6, further comprising the step of performing a second intake event following said exhaust event.

8. The method according to claim 6, wherein:

said exhaust valve comprises an adjustable valve closing, and;

said method further comprising the step of closing said exhaust valve advanced from a valve closing of an immediately prior exhaust event.

9. The method according to claim 7, further comprising the step of deactivating said intake and exhaust valves in a closed valve position to trap fuel vapors within said cylinder.

10. The method according to claim 2, wherein said deactivating of said intake and exhaust valves causes said intake and exhaust valves to assume a closed valve position to trap fuel vapors within said cylinder.

11. The method according to claim 2, wherein:

said intake valve comprises an adjustable valve closing; and said method further comprising the step of opening said valve retarded from a valve opening of an immediately prior intake event.

12. An article of manufacture for ceasing operation of an internal combustion engine in response to a demand for engine cessation, the engine having a throttle valve and a plurality of cylinders, each of the cylinders having a spark plug and an adjoining intake port having a fuel injector disposed therein, said article of manufacture comprising:

a computer usable medium; and a computer readable program code embodied in said computer usable medium for directing the computer to perform the steps of controlling operation of intake and exhaust valves disposed in the engine and the spark plug firing during cessation of engine operation, said intake and exhaust valves being deactivatable, said computer storage medium comprising:

means for determining a demand for cessation of engine operation;

means for determining whether fuel has been injected into an intake port disposed proximately to said cylinder since a corresponding and immediately prior combustion event within said cylinder;

means for performing an intake event and ceasing operation of said intake and exhaust valves, in the event that no fuel has been injected since said corresponding and immediately prior combustion event; and means for performing a first intake event and a combustion event in the event that fuel has been injected since said corresponding and immediately prior combustion event.

13. The article according to 12, further comprising means for performing a second intake event and ceasing operation of said intake and exhaust valves following said combustion event.

14. A system for controlling an internal combustion engine having an intake valve, an exhaust valve, and a spark plug disposed in each cylinder of said engine, said valves being deactivatable, said engine having an engine control unit for controlling cessation of operation of the engine, said system comprising:

a sensor for sensing demand for cessation of engine operation; and an engine controller coupled to said sensor, the engine controller itself comprising:

means for determining whether a fuel injector disposed in an intake port of the cylinder has injected fuel since a corresponding and immediately prior combustion event in the cylinder;

means for performing a trapping intake event and deactivating the intake and exhaust valves if fuel has not been injected since said corresponding and immediately prior combustion event; and means for performing a first intake event and a combustion event if fuel has been injected since said corresponding and immediately prior combustion event.

15. The system according to claim 14, wherein the controller further comprises means for closing a throttle valve disposed in an intake line of the engine.

16. The system according to claim 14, wherein the controller further comprises means for firing the spark plug to initiate said combustion event.

17. The system according to claim 14, wherein the controller further comprises means for performing an exhaust event.

18. The system according to claim 14, wherein the controller further comprises means for performing a second intake event.

19. The system according to claim 14, wherein the controller further comprises means for deactivating the intake and exhaust valves in a closed valve position to trap fuel vapors within the cylinder.

\* \* \* \* \*